Sept. 9, 1952     J. M. KLAASSE ET AL     2,610,226
METHOD AND APPARATUS FOR CONDUCTING GEOPHYSICAL
SURVEYS FROM AN AIRCRAFT
Filed May 12, 1950     4 Sheets-Sheet 1

*Fig. 1.*

Inventors
J. M. KLAASSE
H. JENSEN

Attorneys

Patented Sept. 9, 1952

2,610,226

UNITED STATES PATENT OFFICE 2,610,226

METHOD AND APPARATUS FOR CONDUCTING GEOPHYSICAL SURVEYS FROM AN AIRCRAFT

James M. Klaasse, Troy, N. Y., and Homer Jensen, Philadelphia, Pa.

Application May 12, 1950, Serial No. 161,674

10 Claims. (Cl. 175—182)

(Granted under the act of March 3, 1883, as amended April 30, 1928; 370 O. G. 757)

This invention relates generally to methods and apparatus for measuring magnetic anomalies of geological origin and more particularly to a new and improved method and apparatus for conducting geophysical surveys from an aircraft in flight wherein radio aids to navigation are adapted for use with a magnetic airborne detector to provide correlated records of the position of the aircraft above the surface of the earth and of magnetic data which is simultaneously obtained therewith and provides a measure of anomalous deviations or space changes in the total value of the earth's magnetic field as the aircraft moves along a predetermined traverse.

The earth's magnetic field varies regionally from about 25,000 gammas near the equator to about 70,000 gammas near the magnetic poles, one gamma being equal to $10^{-5}$ oersted which is the unit of magnetic field intensity. Locally, however, the variations in the earth's magnetic field are usually much smaller and depend upon the local magnetic structure of the earth, principally upon the amount of magnetite-bearing rock present.

In conducting geophysical surveys, maps of the magnetic rock formations are prepared from data obtained from measurements of the earth's magnetic field by use of a magnetometer, and from such maps, the formation of related structures are deduced. In oil regions, for example, the magnetic rocks are usually buried deeply beneath sediments of relatively low and homogeneous magnetic permeability, and the field intensity variations measured by a magnetometer are characteristically smooth and of low gradient, being only a few gammas per mile in some cases. In other regions, rocks of widely varying permeability lie near the surface and gradients of many thousands of gammas per mile may be measured.

In certain of the methods and apparatus heretofore devised for conducting geophysical surveys from an aircraft in flight, variations in the earth's magnetic field are continuously measured and recorded by means of a magnetometer, and positions of the aircraft along the traverse are located by simultaneously producing photographic records of the sub-plane terrain disposed along the traverse. Correlation of the recorded aircraft ground positions with the magnetic record obtained simultaneously therewith is accomplished by causing a series of serial numbers to be superimposed on the terrain film as a series of edge marks respectively corresponding thereto are made on the tape carrying the magnetic record. Such a method and apparatus, for example, is disclosed and claimed in the copending application of Lynn H. Rumbaugh et al. for Method and Apparatus for Conducting Geophysical Surveys, Serial No. 682,518, filed July 10, 1946, wherein a Navy magnetic airborne detector designated AN/ASQ-3A and referred to hereinafter as the MAD system, and certain photographic apparatus associated therewith, are respectively adapted to measure and continuously record anomalous deviations in the earth's magnetic field and to permanently fix and record ground positions corresponding thereto.

The prior art methods and apparatus have not been found to be satisfactory for use in conducting airborne magnetic surveys over open water or featureless terrain for the reason that such methods depend upon visual contact with land marks or erected markers in order to locate the ground positions of the aircraft along the traverse. Moreover, such methods do not provide the requisite degree of accuracy in measuring and recording the position of the aircraft and in correlating the magnetic data therewith as is required under certain conditions of geophysical measurements such, for example, as in the case of measuring magnetic anomalies of low gradient such as occur in oil bearing regions.

According to the method and apparatus of the present invention, the aforesaid deficiencies of the prior art methods and apparatus are obviated in the use of radio aids to navigation for locating the points on the earth's surface directly beneath the aircraft without taking observations on external points such as celestial bodies in the firmament or land marks on the surface of the earth. This is accomplished, according to the best mode thus far contemplated for applying the principle of the invention in use of a radio aid to navigation hereinafter referred to as the shoran system which measures the distances in miles between the aircraft and two ground stations by measuring the times required for radio signals to traverse the round trip distances between the aircraft and the ground stations respectively.

This method of aircraft location is utilized in accordance with the preferred method and arrangement of the present invention by causing the aircraft to traverse a plurality of arcs of different radii with respect to one of the ground stations, referred to hereinafter as the "drift" station, and producing simultaneously therewith during each arc traversed records which respectively indicate the deviations of the aircraft from the desired arcs of traverse; by causing identifying marks to appear on this record as the shoran distances to the other of the ground stations, hereinafter referred to as the "rate" station, respectively become integral multiples of a mile; and further indicating on this record which ones of the shoran distances indicated thereon can not be accepted as actual distances of the aircraft from the rate station. The aircraft ground positions thus located along the traverse of the aircraft are correlated with the continuous recorded trace of the MAD system by causing corresponding marks to appear on the magnetic record tape as the shoran mileages are recorded on the aforesaid deviation record, all in the manner, and by the specific means, to be described more fully in detail hereinafter.

An object of the present invention is to provide a new and improved method and apparatus for conducting geophysical surveys from an aircraft in flight.

Another object is to provide a method and apparatus for conducting magnetic explorations from an aircraft in flight in which the location of the aircraft above the surface of the earth is determined by means of radio aids to navigation.

Another object is to provide a method and apparatus for conducting geophysical surveys from an aircraft in flight in which a shoran system is adapted for use with a MAD system, to provide correlated records of the corresponding ground positions beneath the aircraft and the spaced changes in the total value of the earth's magnetic field detected from the aircraft as the aircraft moves along a predetermined traverse.

A further object is to provide a correlated record of shoran data and magnetometer data obtained simultaneously therewith by producing a record indicative of the deviation of the aircraft from a predetermined arc of traverse about one of the ground stations of the shoran system and by simultaneously marking this record and the magnetometer record as the shoran distances from the aircraft to the other of the ground stations respectively become integrals of a mile.

An additional object is to provide a method and apparatus for indicating on the deviation record the intervals during which the shoran mileages indicated thereon can not be accepted as exact distances between the aircraft and the rate station.

Other objects and many of the attendant advantages of this invention will be readily appreciated as the same becomes better understood by reference to the following detailed description when considered in connection with the accompanying drawings wherein.

Figure 1:
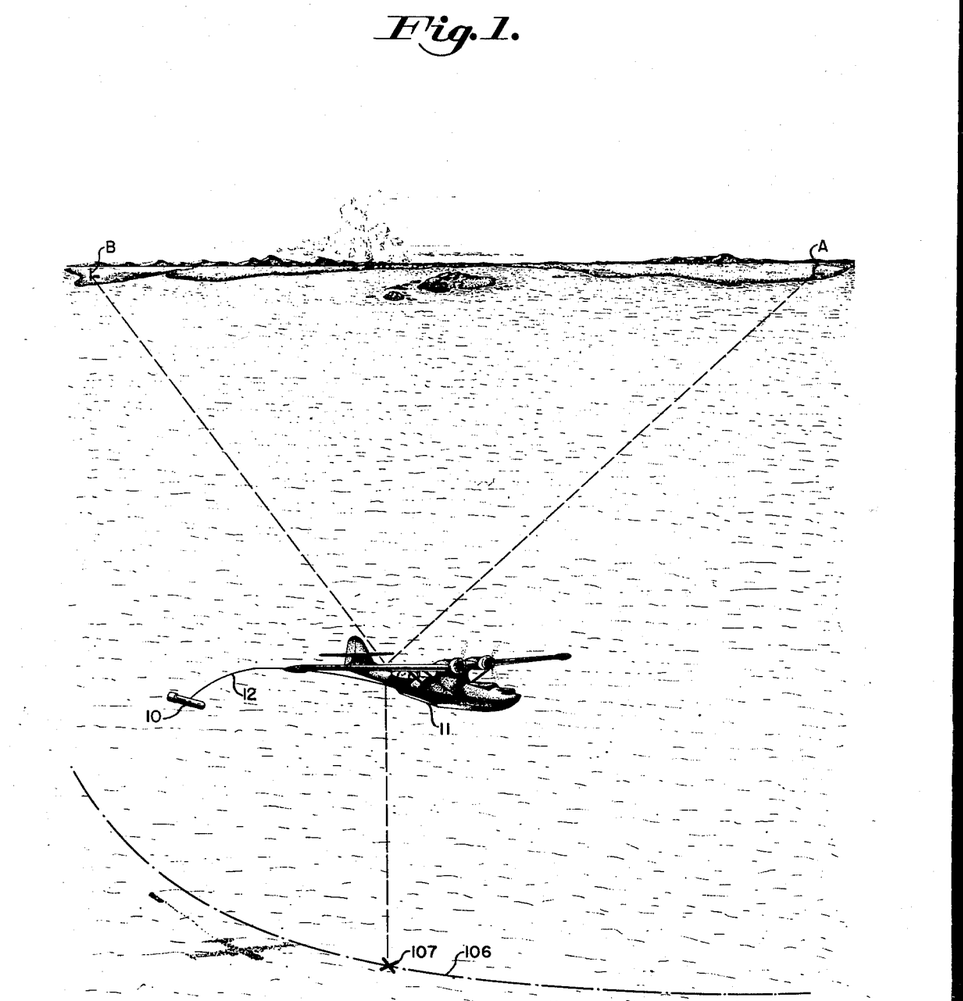
Fig. 1 is a diagrammatic view of an aircraft in flight and of the shoran ground stations for guiding the aircraft along a predetermined traverse above a body of water in accordance with the magnetic surveying methods of the present invention.
Figure 2:
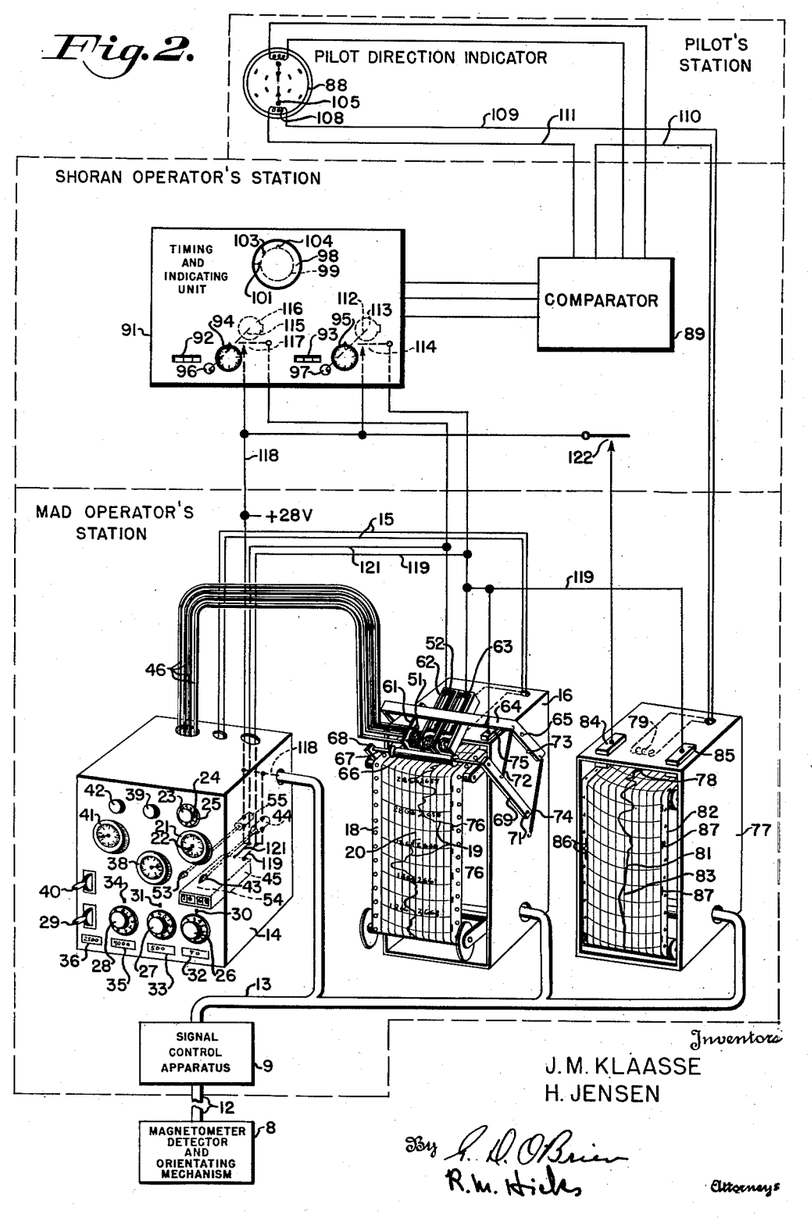
Fig. 2 is a diagrammatic view of the apparatus employed to produce correlated aircraft position and magnetic data according to the preferred embodiment of the invention.
Figure 3:
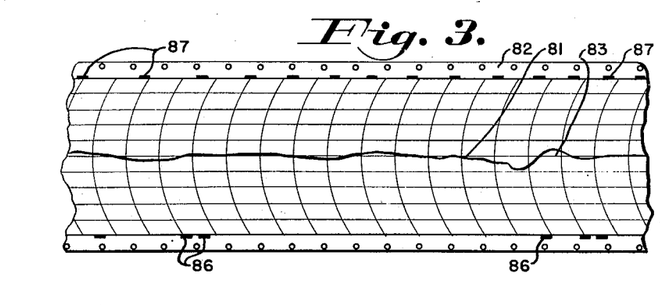
Fig. 3 is a plan view of a fragmentary portion of the deviation record tape obtained in the use of the preferred embodiment of the invention.

Referring now to the drawings for a more complete understanding of the invention, the MAD apparatus shown diagrammatically in Fig. 2 comprises a magnetometer detector and an orienting mechanism therefor, which components are designated by the reference character 8 and contained within the aerodynamic body 10, Fig. 1. The body or bird 10 is of non-magnetic construction and is towed from the aircraft 11 at a distance therefrom by a cable 12 so as to avoid the effects of the magnetic field of the aircraft. The aircraft 11, accordingly, may be of any suitable type providing the desired speed and capacity regardless of the amount of steel which it may contain, the installation of the MAD and the shoran apparatus employed therewith being largely a matter of establishing connections between the components of the apparatus and adapting and mounting the same within the aircraft. The bird, however, must be constructed so as to be aerodynamically stable in flight, a suitable bird, for example, being similar to that disclosed and claimed in the copending application of Gerhard O. Haglund for Aerodynamic Body, Serial No. 671,341, filed May 21, 1946, now Patent No. 2,551,596.

Towing cable 12 is a strain-cored multiconductor cable and serves to electrically interconnect the magnetometer detector and orienting mechanism with the signal control apparatus therefor carried within the aircraft 11 and designated by the reference character 9, whereby a detecting element in the bird is adapted to be maintained in alignment with the direction of the earth's magnetic field under control of the signal control apparatus.

The signal control apparatus 9 also operates to produce electrical signals which correspond to space changes in the total value of the earth's magnetic field sensed by the aforesaid detector element, and these signals are applied by way of a cable conductor 13, control box 14, and conductors 15 to a recording milliammeter 16 to drive the pen thereof, not shown, with respect to its coacting chart 18 whereby a record trace 19 is produced on the chart. Recorder 16 preferably is of the E-A type of spring-driven recorder well known in the art.

The electrical signals produced by the signal control apparatus also operate a galvanometer 21 whereby the pointer 22 thereof indicates in relation to the scale associated therewith, the corresponding movements of the pen of recorder 16.

The control box 14 also includes a sensitivity adjusting dial 23 by means of which the full scale deflection of the recorder pen from edge to edge of the chart 18 may be controlled, the dial being provided, for example, with sensitivities of 50, 100, 200, 500, 1000 and 5000 gammas, and the pointer 24 being movable into positions opposite the numbers 1 to 6 provided on dial plate 25 and corresponding to the aforesaid sensitivities.

The control box further includes a plurality of dials 26, 27 and 28 and a control switch 29 which control means for nulling out predetermined portions of the total field at the detector element and thus determine the magnetic value of the center or base line 20 of the recording chart.

Dials 26 and 27 each have nine positions indicated thereon which are adapted to be moved into alignment with the reference lines 30 and 31 respectively, 50 gammas being provided between positions on dial 26, as indicated at 32, and 500 gammas being provided between positions on dial 27, as indicated at 33. Dial 28 has 10 positions indicated thereon which are adapted to be moved into alignment with the reference line 34, 5000 gammas being provided between these positions, as indicated at 35. Control switch 29 is employed to add 2500 gammas, as indicated at 36, to the nulled out portion of the field, this being useful under certain conditions of adjustment of dials 26 and 27.

Thus, in a total field at the detector element of approximately 56,750 gammas, the nulling means may be arranged to null out permanently 30,000 gammas in the field, dial 28 may be set in position 5 thereof to null out 25,000 gammas, dial 27 set in position 3 thereof to null out 1,500 gammas, and dial 26 set in position 5 thereof to null out 250 gammas whereby the recorder pen is caused to assume a position on the base line 20 of chart 18. Thereafter, upon variation in the field at the detector element, the pen is caused to move to the right or to the left according to increases or decreases in the value of the field from said base value of 56,750 gammas. Occasionally, it becomes necessary to adjust the control box dials 23 and 26 through 28, and rarely control switch 29, to keep the pen on scale on the chart, and at such times a break indicated at 37 on the chart, Fig. 4, occurs in the trace 19.

A suitable milliammeter 38 is employed to indicate a constant value of direct current supplied for nulling purposes, variable portions of the current being supplied to the pickup coil of the aforesaid detecting element according to the adjustments of dials 26 through 28 and control switch 29. It is essential that the D. C. source of nulling current be maintained at a constant value in order that adjustments of the dials produce field changes corresponding accurately to the gamma increments indicated thereby. For this purpose, knobs 39 and 42 are provided, the knobs controlling means for adjusting the current value.

A voltmeter 41 also is employed to indicate the value of the voltage supplied to the MAD, this voltage being derived from the power source of the aircraft. The switch 40 is employed for controlling certain circuits during the routine test of the apparatus.

A control button 43, adapted to close a switch 44, is employed to actuate a register counter 45 having the numbers thereon arranged flush with the front panel of the control box, and simultaneously therewith to actuate other apparatus employed in the control circuit thereof, as will appear more fully hereinafter. An additional button 53 is employed to actuate a similar register counter 54, switch 55 being closed by button 53.

The aforedescribed MAD equipment and the operation thereof are described in considerable detail in the operating and maintenance instructions therefor furnished to the Navy and identified as AN-08-10-252 and CO-AN-08-20-14 respectively, and reference may be had thereto for further details of construction and operation.

Dials 23 and 26 through 28 are operatively connected, as by the flexible cables 46, to conventional printing wheels 51 in the manner disclosed in the copending application of Homer Jensen for Method and Apparatus for Magnetic Exploration, Serial No. 680,906, filed July 2, 1946. Wheels 51 have rubber numerals thereon corresponding to the positions of the dials individual thereto. The driving connections between each of the cables and the printing wheel on one end thereof and between the cable and the control dial on the other end thereof are arranged in any convenient manner, as by gear drives interposed therebetween. For example, a pinion at one end of each of the cables drives a gear secured to the printing wheel individual to the cable, and a pinion at the other end of each of the cables drives a gear secured to the operating shaft of the control dial individual to the cable, the gear ratios at both ends of each of the cables being the same whereby the printing wheels are displaced angularly by the same amount as the dials individual thereto.

Wheels 51 are supported for rotation about a common axis between a pair of spaced plates 61 and 62, plate 62 being U-shaped so as to serve additionally as a bracket support for a pair of conventional electric register counters 52 and 63 which are provided with rubber letters on the wheels thereof.

Plates 61 and 62 are secured to a U-shaped swing frame 64 which is secured, as at 65 on both ends thereof, to the casing of recorder 16 for swinging movement thereon whereby the printing wheels 51 and those of the register counters may be moved into contact with the recording chart 18 to leave thereon an imprint of the numerals appearing on the wheels. To this end, the wheels are caused to pass over an ink roller 66 which is rotatably supported on a rod 67, in turn secured at the ends thereof to arms 68 and 69 which are pivotally secured to the sides of the recorder casing as at 71.

Rod 67 and arms 68 and 69 together comprise a swing frame which is yieldably urged toward swing frame 64 as by a coil spring 72 interconnected therebetween, frame 64 being normally yieldably urged into engagement with a stop pin 73 as by a coil spring 74 interconnected between the extreme end of frame 64 and the recorder casing.

Thus, as frame 64 is moved toward the recording chart 18, the printing wheels carried thereby first pass over the roller 66 to apply ink to the numerals thereon before engaging the chart, the swing frames thereafter returning to their positions as seen in Fig. 2 under power of springs 72 and 74.

A conventional electrical edge-marking device 75, usually provided for use with recorders of the aforesaid type, is cooperatively employed with recorder 16 and is adapted upon each operation thereof to produce an edge-mark 76 on the recorder chart 18.

The signal control apparatus 9, control box 14 and the recording ammeter 16 are located at the MAD operator's station in the aircraft 11. Also located at this station is an additional recording milliammeter 77 which is similar to recorder 16 and having a recording pen 78 which is driven by the coil 79 whereby a trace 81 is produced on the coacting chart 82. The pen is initially positioned at the center or base line 83 on the chart whereby signal variations received by the coil 79 appear in the trace 81 as deviations from the base line 83.

Recorder 77 is also provided with a pair of edge markers 84 and 85 for producing edge marks 86 and 87 respectively on chart 82, these edge markers being similar to the marker 75 employed with recorder 16.

The aforedescribed apparatus in the MAD operator's station is operatively connected, in a manner hereinafter to be described, to the airborne shoran apparatus known as radio set AN/APN-3 which is developed and produced by Radio Corporation of America. For further details of construction and operation of this apparatus reference may be had to "Handbook of Maintenance Instructions for Radio Set AN/APN-3" designated CO-AN-08-30APN3-2-M. Location of the aircraft in flight is determined by the measured shoran mileages to the two ground stations designated A and B, Fig. 1, whose positions are known and at which are located two transmitters known as AN/CPN-2, also developed and produced by Radio Corporation of America.

The airborne shoran apparatus comprises a pilot direction indicator ID-103/APN-3 which is designated by the reference character 88 and located at the pilot's station in aircraft 11. The pilot direction indicator, referred to herein as the PDI, is operatively connected to the comparator CM-3/APN-3 designated 89 and located at the shoran operator's station in the aircraft. The comparator, in turn, is controlled by the timing and indicating unit ID-17/APN-3, which is designated 91 and also located in the shoran operator's station.

In the operation of the shoran system, a sequence of pulses at a carrier frequency in the range 220 to 260 megacycles are transmitted from an aircraft. The propagated pulses trigger an operating ground station which gives a similar pulse response on about 310 megacycles which is detectable by the airborne shoran apparatus. The airborne shoran operator manipulates the controls so as to read directly the distance to the ground station in miles, and the distances from two ground stations such, for example, as stations A and B of Fig. 1, are determined continuously and simultaneously. These distances are indicated by the counters 92 and 93 and the associated dials 94 and 95 of the timing and indicating unit 91 which indicate the distances to the ground stations A and B respectively. The settings of dials 94 and 95 are respectively controlled by adjustment of two computer vernier hand wheels 96 and 97 therefor.

In the adjustment of the hand wheels, the shoran operator is guided by an oscilloscope screen 98 having a circular time scale 99 on which appear a reference pip 101 and two distance pips 103 and 104 which are displaced along the circular time axis a distance from the reference or fixed pip 101 depending on the difference between the settings of the distance computer vernier scales 94 and 95 individual thereto and the distance to the stations A and B. By reason of this arrangement, the operator merely adjusts the two computer vernier hand wheels to achieve superposition of all three pips, and at that time the distances may be read directly on the counters. In an inverse sense, as a counter reading is set at a desired distance from the corresponding ground station, then the shoran operator can guide the pilot until the corresponding pip lines with the reference pip.

The instantaneous displacement of the pip, which is indicative of the "pilot error," is followed over a small interval from zero by the deflection of the meter needle 105 of the pilot direction indicator 88 at the pilot's station in the aircraft. This provides automatic shoran guidance to the pilot to keep the aircraft on an arc at a constant distance from one of the ground stations. This method is used in accordance with the principle of the present invention to keep the aircraft at a constant distance from the drift station, which as disclosed in Fig. 1, is ground station A and wherein the arc of traverse about station A is indicated by the dashed line 106.

In traversing the arc of constant radius, the times at which the distance to the other station, the rate station, which as disclosed in Fig. 1, is station B, become integral multiples of a mile are determined, thereby to locate the instantaneous positions of the aircraft 11 with respect to points in the sub-plane terrain directly therebelow along the arc of traverse, such a point, for example, being indicated by the cross mark 107 in Fig. 1.

It will be understood that other tactical methods of locating the aircraft position in the subplane may be employed such, for example, as the method wherein the aircraft is caused to traverse compass courses on a straight line and wherein check points at the intersection of two station distances obtained simultaneously are obtained and recorded.

The coil 108 for driving the needle 105 of PDI 88 is connected in series, as by conductors 109, 110 and 111, with the pen driving coil 79 of recorder 77. By reason of this arrangement, the base line 83 corresponds to the arc of traverse or zero error line of the aircraft and the trace 81 provides a PDI error record in which the deviations from the base line indicate the deviations of the aircraft from the desired arc of traverse.

The shoran operator sets dial 94 to a distance corresponding to the desired arc of traverse and constantly adjusts the hand wheel 97 for the rate station to keep the rate pip 104 on the reference pip 101. One revolution of shaft 112 for hand wheel 97 corresponds to a change of rate distance of one mile. A cam 113 is secured to this shaft so that every time the rate distance becomes an exact integral multiple of a mile, the cam is caused to close a microswitch 114 cooperatively associated therewith. Similarly, a shaft 115 for hand wheel 96 has a cam 116 secured thereto for closing switch 117 when the drift dial 94 is set at exact integral multiples of a mile.

The fixed contacts of switches 114 and 117 are connected as by conductor 118 to the 28 volt power source of the aircraft, this conductor also being connected to switches 44 and 55 whereby power is supplied for operating registers 45 and 54 as buttons 43 and 53 are actuated to close the switches, the other side of these switches being connected as by conductors 119 and 121 to registers 45 and 54 respectively. These conductors are also connected to the moving contacts of switches 114 and 117 respectively in parallel with the operating coils of the printing wheel registers 63 and 52 respectively. Conductor 119 is also connected to the edge markers 75 and 85 of recorders 16 and 77 respectively.

By reason of this arrangement, each of indicating register 45, printing register 63, edge marker 75, and edge marker 85 are operated each time switch 114 is closed, whereby the edge marks 76 on the chart 18 of recorder 16 and the edge marks 87 on chart 82 of recorder 77 are caused to appear thereon simultaneously, and numerals indicative of the rate and drift distances are indicated by the registers 45 and 54 and these numerals are caused to appear on chart 18 of recorder 16, along with the MAD data provided on printing wheels 51, when the frame 64 is rocked to produce a print of the numerals which have been brought into a setting for printing by the registers 63 and 52.

Figure 4:
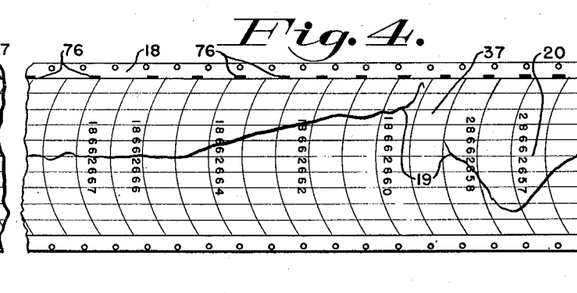
Fig. 4 is a plan view of a fragmentary portion of the magnetic record tape obtained in the use of the MAD system employed in the present invention.

Thus, an eight digit number is caused to appear on chart 18, Fig. 4, each time frame 64 is rocked to produce the aforedescribed printing operation. The number 28662657 appearing thereon, for example, indicates by the extreme left hand numeral 2 that the sensitivity of the MAD apparatus is 100 gammas from edge to edge of the chart 18; the adjacent numbers 866 indicate together with the displacement of trace 19 a measured field of 73,335 gammas; the next adjacent numerals 26 indicate an arc of traverse of 26 miles from drift station A; and the extreme right hand numerals 57 are indicative of the distance in miles from the rate station B.

Figure 5:
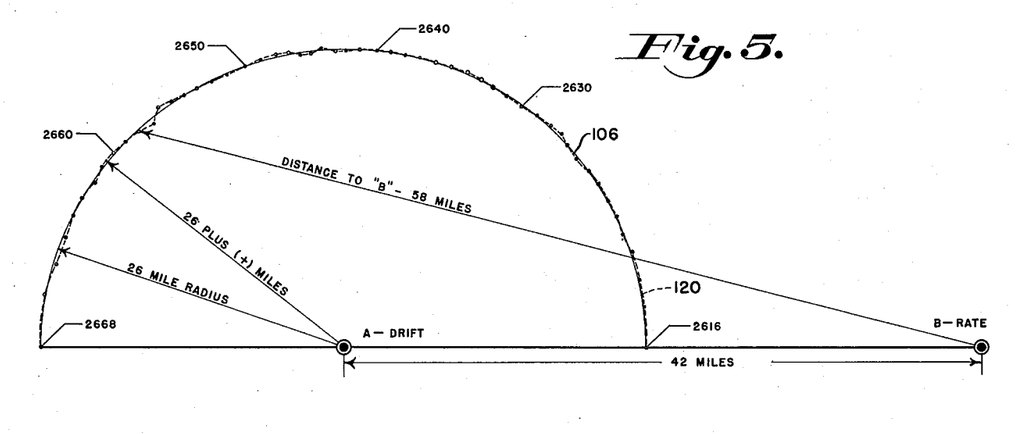
Fig. 5 is a diagrammatic view illustrating a desired arc of traverse with respect to the ground stations and the actual traverse of the aircraft after corrections have been made for deviations from the arc at the measured shoran mileage points along the traverse.

It will be understood that the numerals indicated by registers 45 and 63 represent the actual miles only when these registers have been initially set at 16 miles and the arc of traverse 106, as shown in Fig. 5 is started from the position intermediate the ground stations. When the direction of traverse is reversed, and in the absence of means for reversing the direction of rotation of registers 45 and 63, the distances indicated thereby will increase whereas the distances between the aircraft and station B will progressively decrease. However, even in the absence of such register reversing means, the numbers provided by the registers are helpful in analyzing the charts 18 and 77 and in producing the true arc of traverse indicated by the dashed line 120.

When deemed desirable, the registers 45, 52, 54 and 63 may be dispensed with and the distances from the A and B stations may be written on the recorder charts by the MAD operator at the termini of arcs, this information being supplied to the MAD operator by the shoran operator over intercom phones, not shown. Such notations may be made only at the beginning and end of each arc, as the intervening edge marks 76 and 87 give successive mile intervals of rate distance.

It will be apparent that closing of switches 44 and 55 by manipulation of buttons 43 and 53 will also produce simultaneously a change in settings of indicating registers 45 and 54 and printing registers 63 and 52 together with actuation of edge markers 75 and 85, when it is desired to provide an initial setting of the registers at the start of a traverse, or when it is desired to change a setting during the traverse.

Time corollation is thus provided by the charts 18 and 82 by operation of the edge markers 75 and 85, and the edge marks 76 and 87 indicate the times at which the rate station distances become exact integral multiples of a mile, providing that the reference and rate pips 101 and 104 were aligned.

In order to indicate when the distance data given by the edge marks 76 and 87 can be accepted as correct, i. e., when the reference and rate pips are aligned, edge marker 84 is employed to imprint the marks 86 on chart 82 in a manner to indicate the intervals during which the pips are and are not aligned. To this end, a foot pedal actuated switch 122 is arranged to be closed by the shoran operator momentarily in rapid succession when the pips become disaligned, thereby to form the closely spaced edge marks 86 on the chart. Thereafter, when the pips again become aligned, the switch is momentarily closed once to form the single edge marks 86. Thus, the edge marks 87 disposed between a double edge mark 86 and a subsequent single edge mark 86 can not be accepted as correct integral mile rate distances.

In the use of the aforedescribed system in conducting magnetic surveys over unchartered areas such, for example, as the offshore shelf illustrated in Fig. 1, a series of surveyed ground station locations such, for example, as stations A and B are planned along the coast bordering the proposed survey area. Only two adjacent locations are manned at any time. The first location is used as the drift station and the second is used as the rate station. A family of arcs such, as the arc 106, is then flown around the drift station A as the center. Thereafter, the equipment at the second location is operated as the new drift station and the equipment and personnel from the first station is transferred to the third location which acts as the new rate station, and so on down the coast. Check or base lines are flown for each family of arcs which intersect each family of arcs most nearly orthogonally.

During each arc traversed, the recorders 16 and 17 are operated continuously and simultaneously to produce on their respective charts the magnetic trace 19 and the pilot error trace 81, and at the mile intervals from the rate station the edge marks 76 and 87 are caused to appear simultaneously on their respective charts 18 and 82. The numbers appearing in the register counter 54 indicates the radius of traverse, i. e., the distance from the drift station, and the numbers appearing in register counter 45 continually change as the aircraft moves progressively closer to or farther away from the rate station, as the case may be, according to the direction of flight of the aircraft along the traverse.

Printing wheels 51 assume different settings for printing in accordance with the adjustment of the various dials on the control box 14, and the printing wheels of register counters 52 and 63 assume settings for printing concurrently with, and in accordance with the settings taken by the numbers indicated on registers 54 and 45, whereby the printing wheels are caused to imprint a record of the instantaneous settings thereof at the time the swing frame 64 is actuated, this being done at various intervals along the traverse as indicated by the frequency of appearance of these printed numbers on the fragmentary portion of the magnetic record tape 18, as best seen in Fig. 4. It will be noted that these numbers preferably are imprinted on the recorder tape just prior to and after a change in the sensitivity setting of the control box indicated by the break 37 in trace 19.

At such times during each traverse when the rate and reference pips become disaligned the shoran operator operates the foot pedal switch 122 to form the successive double and single edge marks 86 on the pilot error record 82, thereby to indicate which of the edge marks 87 appearing thereon should be rejected and which of the marks may be accepted as exact integral multiples of one mile distances from the rate station.

The date thus obtained for each traverse as provided by the time corollated magnetic and pilot error charts 18 and 82 are utilized in constructing the actual line of flight of the aircraft as indicated by the dashed line 120 in Fig. 5 wherein the deviations of this line from the desired arc of traverse 106 correspond to the deviations of trace 81 from the base line 83 of chart 82, and are further utilized in assigning values of the earth's magnetic field to various points along the reconstructed traverse according to the values of the field at these points as provided by the trace 19 of the magnetic chart 18. Calibration in feet of the radial displacement of the aircraft from the desired arc as indicated on the pilot error record permits computing the actual distance to the drift station by adding the displacement correction algebraically to the radius of flight.

From these ground and magnetic field corollated records, isomagnetic maps of the magnetic rock formations of the surveyed areas are prepared, and these are utilized in deducing the formation of related structures which may be indicative, for example, of the presence of oil.

Figures 6, 7:
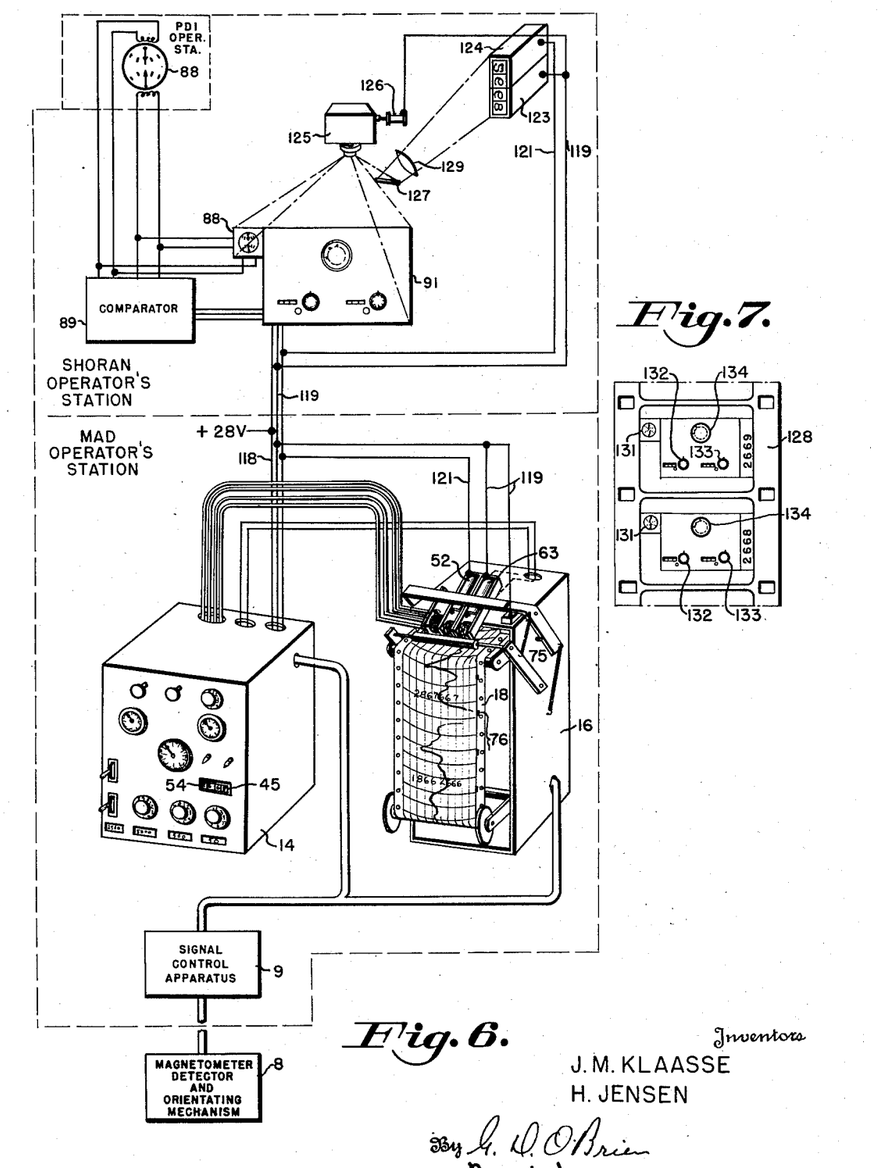
Fig. 6 is a diagrammatic view of apparatus according to an alternate embodiment of the invention.
Fig. 7 illustrates a fragmentary portion of the deviation record obtained in the use of the apparatus of Fig. 6.

In Fig. 6 there is disclosed an alternative embodiment of the present invention wherein recorder 77 and the pedal operated switch 122 are dispensed with and the corollation between the MAD and shoran data is accomplished by providing a composite photographic record of the information appearing on the PDI 88, the timing and indicating unit 91, and a pair of register counters 123 and 124 which are caused to operate concurrently with register counters 45 and 54 respectively, the apparatus otherwise being the same as employed in Fig. 2 and, accordingly, the same reference characters have been employed to designate the same or similar parts appearing in these figures.

More specifically, for the aforedescribed purpose, an additional PDI 88, which is connected in parallel with the PDI 88 located at the pilot's station, is placed adjacent to the timing and indicating unit 91 so as to be included within the field of view of the moving picture camera 125 which is constructed and arranged to provide single frame exposures as the relay 126 is actuated to operate the shutter of the camera.

A mirror 127 is disposed within the field of view of camera 125 substantially in the manner as shown so as to bring images of the numerals appearing on register counters 123 and 124 into the field of view of the camera in focus with the images of the shoran dials whereby the composite photograph record 128 of Fig. 7 is produced. To this end, a focusing lens 129 preferably is employed, and the numerals on the register counters are preferably mounted backwards in order that these numbers will appear frontwards on record 128.

In the fragmentary portion of record 128 appearing in Fig. 7, two successive exposures are shown as indicated by the successive numbers 2668 and 2669 which, as aforedescribed, indicate a drift station distance or arc of 26 miles radius and rate distances of 68 and 69 miles respectively. The PDI information is indicated at 131 on this record and the drift and rate distances are indicated as at 132 and 133 respectively on the counters and dials of the indicating unit. The photograph of the oscilloscope screen also appears on the record as at 134 whereby there is provided a visual indication of the alignment or disalignment, as the case may be, of the rate and drift pips with respect to the reference pip.

Thus, the photographic record 128 provides the shoran and PDI data which may be utilized in reconstructing the true line of traverse of the aircraft for each arc traversed, and each exposure is provided with an identifying number for corollating the photographic record with the magnetic record 18 whereby the instantaneous values of the earth's magnetic field as provided by the magnetic record may be assigned to the points of measurement of these values along the traverse.

Relay 126 and register 123 are connected to conductor 119 which is also connected to edge marker 75 and registers 45 and 63 of recorder 16 whereby these devices are all operated simultaneously each time switch 114 of the timing and indicating unit 91 closes as the distances to the rate station become integral multiples of a mile. Similarly register counter 124 is connected to conductor 121 which is also connected to counters 52 and 54 whereby these counters are operated simultaneously each time the drift distances or arc is changed and switch 117 of the timing and indicating unit is closed as a result of such change.

From the foregoing it should now be apparent that methods and apparatus for conducting geophysical surveys by means of radio aids to navigation have been provided which are well adapted to fulfill the aforestated objects of the invention. Moreover, whereas, a preferred embodiment of the invention and alternative embodiment thereof which gives satisfactory results have been disclosed herein, obviously many modifications and variations of the present invention are possible in the light of the above teaching. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is desired to be secured by Letters Patent of the United States is:

1. A method of conducting geophysical surveys from an aircraft in flight which comprises the steps of utilizing radio aids to navigation to maintain the aircraft approximately in line with a desired line of traverse, producing a record of integral multiple mile distances from the aircraft to a pair of ground stations measured by said radio aids as the aircraft moves along the traverse, producing on said first named record a second record indicative respectively of the accept-reject conditions of said measured distances with respect to the accuracy of measurement thereof, producing a continuous record trace indicative of the space changes in the absolute value of the earth's magnetic field as the aircraft moves along the traverse, and producing simultaneously on said distance and trace records indicia means indicative of the time correlation thereof during said traverse of the aircraft.

2. A method of geophysical surveying which comprises the steps of flying an aircraft and magnetometer apparatus associated therewith along a predetermined traverse over an area to be surveyed, utilizing radio aids to navigation operable from the aircraft and with respect to a pair of transmitter stations fixedly located in predetermined spaced relation in the sub-plane terrain to maintain the aircraft approximately in line with said predetermined traverse, producing a record of integral multiple mile distances from the aircraft to the ground stations measured by said radio aids as the aircraft moves along the traverse, producing on said first named record a second record indicative respectively of the accept-reject conditions of said measured distances with respect to the accuracy of measurement thereof, producing a continuous record trace corresponding to space changes in the absolute or static value of the earth's magnetic field measured by the magnetometer as the aircraft moves along said traverse, and producing simultaneously on said distance and trace records indicia means indicative of the time correlation thereof during said traverse of the aircraft.

3. A method of geophysical surveying which comprises the steps of flying an aircraft having magnetometer and shoran apparatus over an area to be surveyed, utilizing the shoran apparatus to guide the pilot of the aircraft so as to maintain the aircraft approximately along a predetermined arc of traverse with respect to one of two transmitter stations fixedly located in predetermined spaced relation in the subplane terrain, producing a record indicative of measurable radial deviations of the aircraft from said arc of traverse and corresponding to the pilot error in guiding the aircraft, producing a record trace of space changes in the absolute value of the earth's magnetic field measured by the magnetometer apparatus as the aircraft moves along the traverse, producing simultaneously on said deviation and trace records indicia means indicative of the integral multiple mile distances from the aircraft to the other of said transmitter stations as measured by the shoran apparatus thereby to time-correlate the deviation and time records and to locate the aircraft along the traverse, and producing on the deviation record indicia means indicative respectively of the accept-reject conditions of said measured shoran mileages.

4. A method of geophysical surveying which comprises the steps of flying an aircraft having magnetometer and shoran apparatus over an area to be surveyed, setting the drift distance controls of the shoran apparatus so that the pilot direction indicator thereof guides the pilot of the aircraft along a predetermined arc of traverse with respect to one of two transmitter stations fixedly located in predetermined spaced relation in the sub-plane terrain, producing a record trace indicative of measurable radial deviations of the aircraft from the desired arc of traverse, utilizing the reference and rate pip indications on the oscilloscope screen of the shoran apparatus to continuously adjust the rate distance controls thereof in such a manner that single revolutions of the control shaft correspond to integral multiple mile distances from the other of said stations when the reference and rate pips are aligned, producing on said record trace indicia means indicative of intervals during the traverse when the reference and rate pips are not aligned, producing a record trace indicative of the space changes in the absolute value of the earth's magnetic field measured by the magnetometer apparatus as the aircraft moves along the traverse, and utilizing complete revolutions of said rate control shaft to simultaneously produce on said deviation and magnetic trace records indicia means indicative of the shoran mileages from the aircraft to said other of the stations thereby to time-correlate the deviation and magnetic trace records and to locate the aircraft along the traverse.

5. A method of geophysical surveying which comprises the steps of flying an aircraft having magnetometer, shoran, and photographic apparatus over an area to be surveyed, setting the drift distance controls on the timing and indicating unit of the shoran apparatus so that the pilot direction indicator thereof guides the pilot of the aircraft along a predetermined arc of traverse with respect to one of two transmitter stations fixedly located in predetermined spaced relation in the sub-plane terrain, utilizing the reference and rate pip indications on the oscilloscope screen of said timing and indicating unit to continuously adjust the rate distance controls thereof in such a manner that single revolutions of the control shaft correspond to integral multiple mile distances from the other of said stations when the reference and rate pips are aligned, utilizing said photographic apparatus to produce a series of composite photographic records of the pilot direction indicator, timing and indicating unit, and a number register counter, producing a continuous record trace indicative of space changes in the absolute value of the earth's magnetic field measured by the magnetometer apparatus as the aircraft moves along the traverse, and utilizing complete revolutions of said rate control shaft to simultaneously operate the photographic apparatus and register counter and produce indicia means on said magnetic trace record thereby to time-correlate the photographic record with the magnetic trace.

6. A method of conducting geophysical surveys from an aircraft in flight which comprises the steps of producing a measurable record trace indicative of space changes in the absolute value of the earth's magnetic field as the aircraft moves over an area to be surveyed, stamping said record at preselected intervals with a multi-digit number indicative at the time of stamping of the sensitivity of field measurement, indicative of a magnetic field value which when added to the appropriate trace deviation gives a measure of the absolute value of the earth's magnetic field, and indicative of measured shoran mileages from the aircraft to two transmitter ground stations, guiding the aircraft in an arc of traverse of substantially constant radius about one of said stations, producing a measurable record trace indicative of the radial deviations of the aircraft from said arc of traverse, simultaneously edge-marking said magnetic and deviation records as the measured shoran mileages become integral multiples of one mile distances from the other of said stations, and edge-marking at least one of said records at the beginning and end of intervals in which the measured shoran mileages are not true distance measurements to the other of said stations.

7. Apparatus for conducting geophysical surveys comprising in combination, an aircraft, shoran apparatus carried by the aircraft, a pair of shoran transmitter ground stations located in fixed spaced relation in the sub-plane terrain and cooperatively operable with said airborne shoran apparatus to measure the distances from the aircraft to the transmitter stations, a magnetometer carried by the aircraft, means responsive to said magnetometer and including a first milliammeter tape recorder for producing a continuous trace on the tape indicative of space changes in the absolute value of the earth's magnetic field as the aircraft is guided by said shoran apparatus along an arc of traverse of substantially constant radius about one of said ground stations, means including a second milliammeter tape recorder controlled by said airborne shoran apparatus for producing on the recorder tape a trace indicative of the pilot error in maintaining the aircraft on said arc of traverse, means including a switch arranged to be closed by the airborne shoran apparatus as the mileages measured thereby to the other of said ground stations become integral multiples of one mile for simultaneously marking the tape records of said first and second recorders, and means including a switch arranged to be operated by the operator of the airborne shoran apparatus for marking the tape record of at least one of said recorders at the beginning and end of intervals during which said measured mileages from the aircraft to said other of the stations are not true measurements of the distances therebetween.

8. Apparatus for conducting geophysical surveys from an aircraft in flight which comprises magnetometer and shoran apparatus carried by the aircraft, said magnetometer apparatus including means for producing a record trace indicative of space changes in the absolute value of the earth's magnetic field as the aircraft moves over an area to be surveyed in the subplane terrain, said shoran apparatus including a pilot direction indicator having a coil driven indicating needle for guiding the pilot in flying the aircraft in an arc of traverse of substantially constant radius about one of two transmitter stations located in fixed spaced relation in said sub-plane terrain, said shoran apparatus also including a timing and indicating unit having a pair of vernier computer dials for indicating respectively the distances from the aircraft to said ground stations, said dials having hand wheels and control shafts individual thereto for changing the settings of the dials respectively, said timing and indicating unit having means including an oscilloscope screen for producing thereon a reference pip and rate and drift pips which are displaced circumferentially on the screen from the reference pipe in accordance with the differences between the shoran mileages indicated by said dials from the aircraft to said transmitter stations and the true distances thereto, said hand wheel individual to said drift pip being adjusted to a dial setting corresponding to the mileage from the aircraft to said one of the stations and said hand wheel individual to said rate pip being continuously adjusted to maintain the reference and rate pips in alignment, a milliammeter tape recorder having a pen driving coil connected in series with the needle-driving coil of the pilot direction indicator whereby a trace indicative of the pilot error is produced on the recorder tape, a cam carried by the control shaft individual to said rate hand wheel, a switch arranged to be closed by said cam during each complete revolution of the rate control shaft and when the rate dial indicates exact integral multiples of one mile, means controlled by said switch for simultaneously marking said magnetic trace record and said pilot error tape record as the switch closes, a switch arranged to be closed by the operator of the timing and indicating unit at the beginning and end of intervals during which the reference and rate pips are not in alignment, and means controlled by said last named switch for marking said pilot error record tape as the switch closes.

9. Apparatus for conducting geophysical surveys from an aircraft in flight and with respect to rate and drift shoran-equipped transmitter stations located in fixed spaced relation in the subplane terrain comprising, in combination, airborne shoran apparatus carried by the aircraft and including a pilot direction indicator, a comparator for controlling operation of the pilot direction indicator, and a timing and indicating unit for controlling operation of the camparator, said timing and indicating unit having hand wheel controlled vernier computer dials for indicating the distances from the aircraft to said rate and drift ground stations and an oscilloscope screen having a circular trace and reference and rate and drift pips thereon, said rate and drift pips indicating by the displacement thereof from said reference pips the differences between the distances indicated by said dials and the true distances from the aircraft to said rate and drift stations respectively, the dial individual to the drift pip and station being set at a predetermined distance whereby the pilot in following the pilot direction indicator causes the aircraft to move in an arc of traverse of substantially constant radius about the drift station, a first milliammeter tape recorder connected in series with the pilot direction indicator whereby a trace is produced on the tape indicative of the pilot error in maintaining the aircraft on said arc of traverse, a magnetometer carried by the aircraft for detecting space changes in the absolute value of the earth's magnetic field, a control box for setting the sensitivity of the magnetic field measurement of the magnetometer and for nulling out predetermined portions of the earth's magnetic field detected thereby, means including a second milliammeter tape recorder operated by said control box for producing on the record tape a trace indicative of said space changes in the absolute value of the earth's field, the dial individual to the rate pip and station being adjusted continuously to maintain the rate pip in alignment with the reference pip, a pair of shafts individual to said hand wheel controlled dials, a pair of cams carried by said shafts respectively, a pair of switches arranged to be closed respectively by said cams when the dials individual thereto indicate integral multiples of one mile, a swing frame carried by said second recorder, a plurality of printing wheels carried by said frame and connected to said control box and arranged to be moved thereby to different settings in accordance with the adjustments of the control box, one of said printing wheels having numerals corresponding to the different sensitivity settings of the control box, the remaining printing wheels having numerals indicative of portions of the earth's field nulled at the magnetometer by certain settings of the control box, a pair of register counters carried by said swing frame and having printing wheels individual thereto, means including said printing wheels for stamping a multi-digit number on the tape of the second recorder upon predetermined movement of the swing frame, a pair of edge markers for said first and second recorders respectively, circuit means including said edge markers, one of said register counters and the one of said switches individual to the rate dial for operating said edge markers and said one of the register counters when the switch is closed, circuit means including the other one of said register counters and the other one of said switches for operating said other counter when said other switch is closed, a second edge marker for said first recorder, a foot pedal switch arranged to be closed by the operator of the timing and indicating unit at the beginning and end of intervals during which the reference and rate pips are not aligned, and circuit means including said foot pedal switch and said last named edge marker for operating the same when the pedal switch is closed.

10. Apparatus for conducting geophysical surveys from an aircraft in flight and with respect to shoran drift and rate stations located in fixed spaced relation in the sub-plane terrain comprising, in combination, airborne Shoran apparatus carried by the aircraft and including a pair of pilot direction indicators connected in parallel, a comparator for controlling operation of the pilot direction indicators, and a timing and indicating unit for controlling operation of the comparator, one of said pilot direction indicators being located at the pilot's station in the aircraft and the other pilot direction indicator being arranged in side by side relation with said timing and indicating unit with the indicating surfaces disposed in the same plane, said timing and indicating unit having hand wheel controlled vernier computer dials for indicating the distances from the aircraft to said rate and drift ground stations and an oscilloscope screen having a circular trace and reference, rate and drift pips thereon, said rate and drift pips indicating by the displacement thereof from said reference pip the differences between the distances indicated by said dials and the true distances from the aircraft to said rate and drift stations respectively, the dial individual to the drift pip and station being set at a predetermined distance whereby the pilot in following said pilot direction indicator at the pilot's station causes the aircraft to move in an arc of traverse of substantially constant radius about the drift station, a magnetometer carried by the aircraft for detecting space changes in the absolute value of the earth's magnetic field, a control box having control means for setting the sensitivity of measurement of the magnetometer and for nulling out predetermined portions of the earth's magnetic field detected thereby, means including a milliammeter tape recorder operated by said control box for producing on the record tape a trace indicative of said space changes in the absolute value of the earth's field, the dial individual to the rate pip and station being adjusted continuously to maintain the rate pip in alignment with the reference pip, a pair of shafts individual to said hand wheel controlled dials, a pair of cams carried by said shafts respectively, a pair of switches arranged to be closed respectively by said cams when the dials individual thereto indicate integral multiples of one mile, a swing frame carried by said recorder, a plurality of printing wheels carried by said frame and connected to said control means of the control box and arranged to be moved thereby to different settings in accordance with the adjustments thereof, one of said printing wheels having numerals corresponding to the different sensitivity settings of the control box, the remaining printing wheels having numerals indicative of portions of the earth's field nulled at the magnetometer by certain settings of the control box, a pair of register counters carried by said swing frame and having printing wheels individual thereto, means including said printing wheels for stamping a multi-digit number on the tape of said recorder upon predetermined movement of said swing frame, an edge marker for the recorder, a pair of register counters having indicating dials, a single frame camera having said dial indicating registers, and the timing and indicating unit and its associated pilot direction indicator included in the field of view of the camera and having a relay for operating the shutter thereof, circuit means including the one of said switches individual to the rate dial for operating said shutter relay, edge marker, one of said printing wheel registers, and one of said dial indicating registers each time said one of the switches closes, and circuit means including the other of said switches for operating the other ones of said printing wheel and dial indicating register counters each time said other one of the switches closes.

JAMES M. KLAASSE.
HOMER JENSEN.

REFERENCES CITED

The following references are of record in the file of this patent:

"Electronics," March 1948, pages 112–114.
"Transactions, American Geophysical Union," vol. 30, No. 6, December 1949, pages 836–848.
"Geophysics," January 1950, pages 102–109.